April 12, 1966  R. A. PETERSON  3,245,488
CONTROL ARRANGEMENT AND STEERING OF TRACTORS IN TANDEM
Filed March 19, 1964  2 Sheets-Sheet 1
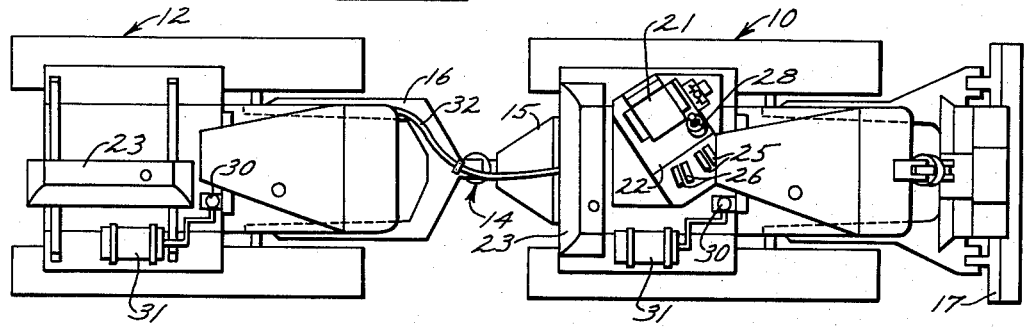
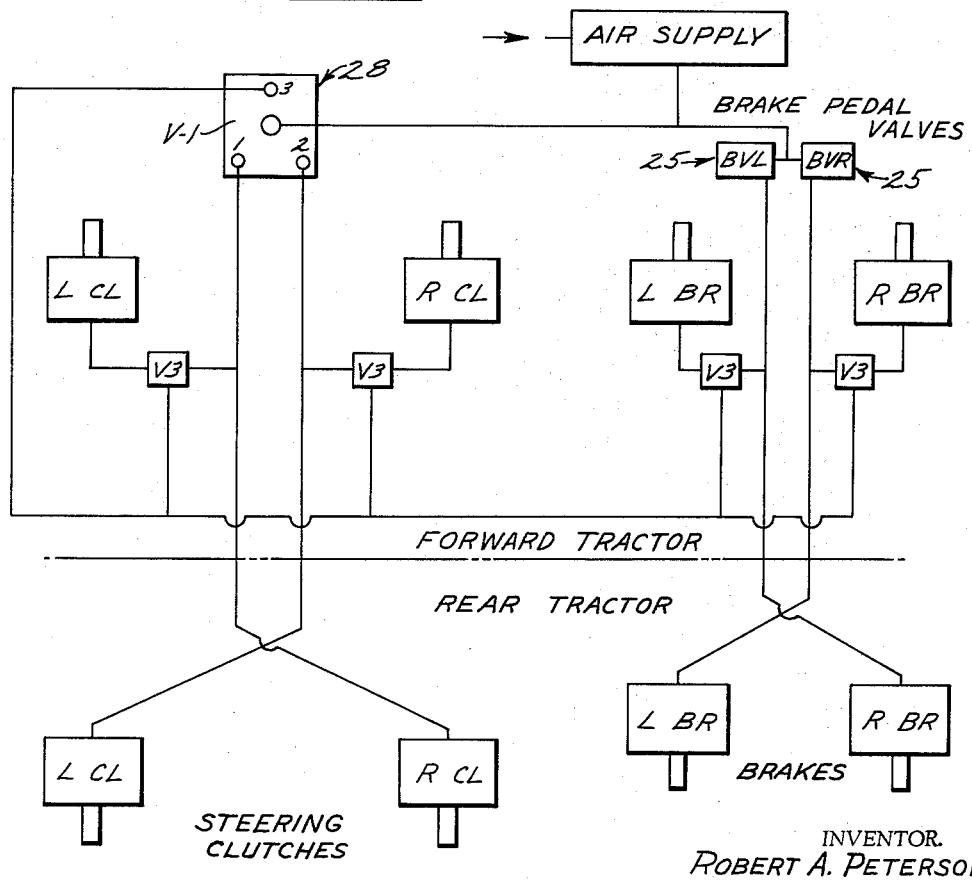
INVENTOR.
ROBERT A. PETERSON
BY
*ATTORNEYS*

April 12, 1966  R. A. PETERSON  3,245,488
CONTROL ARRANGEMENT AND STEERING OF TRACTORS IN TANDEM
Filed March 19, 1964  2 Sheets-Sheet 2
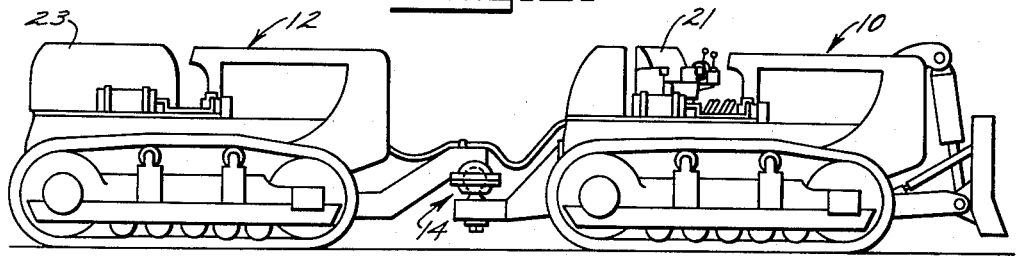
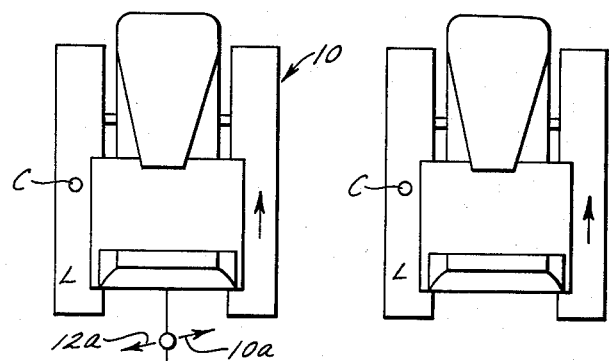
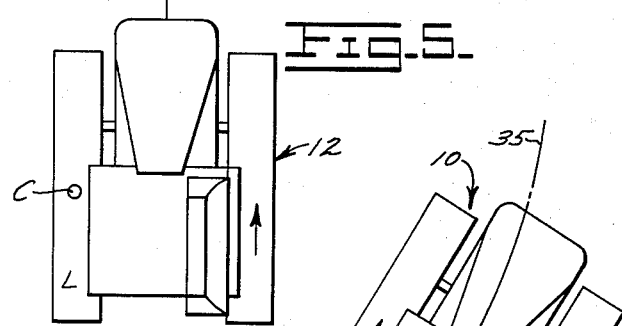
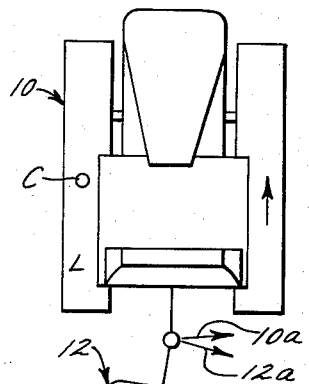
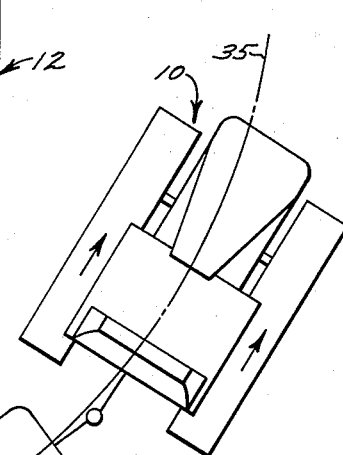
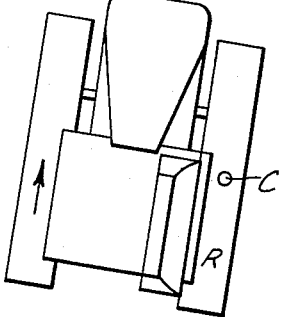
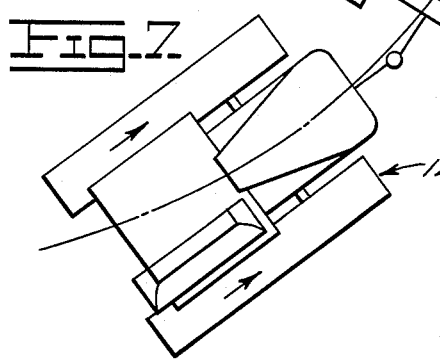
INVENTOR.
ROBERT A. PETERSON
BY
*Fryer and Ginwold*
ATTORNEYS United States Patent Office 3,245,488
Patented Apr. 12, 1966

3,245,488
CONTROL ARRANGEMENT AND STEERING OF TRACTORS IN TANDEM
Robert A. Peterson, San Leandro, Calif., assignor to Caterpillar Tractor Co., Peoria, Ill., a corporation of California
Filed Mar. 19, 1964, Ser. No. 353,164
2 Claims. (Cl. 180—14)

This invention relates to a method and apparatus for steering two track-type tractors which are connected to each other in tandem to achieve high power output.

There are applications for heavy equipment such as earth moving equipment where power requirements exceed maximum output of the largest tractors available. Since it is presently considered uneconomical or infeasible to produce tractors of much greater size, it has become common pactice to employ two tractors in some operations where the power required exceeds the output of one. One example of such practice is found in the operation of large earthmoving scrapers which are incapable under most conditions of picking up a full load of earth under their own power. Currently one or two tractors are employed to push the scraper during its loading cycle. The approach and impact of a pusher tractor have obvious and well-known disadvantages which are multiplied by the use of two tractors. Also reduced efficiency results from the necessity of two operators whose actions cannot be perfectly synchronized in a pushing operation.

It is an obvious consequence of the foregoing facts that two tractors coupled together and controlled by one operator can produce superior results in power output and particularly for pushing operations. The use of two track-type tractors coupled in tandem, which appears most feasible for many operations, presents certain problems. One problem arises in connection with steering. Since track-type tractors are steered by driving or by braking, which means that one track is stationary while the other drives, they do not lend themselves readily to tandem steering. Another problem arises in connection with the location of the operator's station. If the operator of tandem track-type tractors occupies the usual station on the rearward machine, his view of a push block, blade, or any forward mounted tool on the forward machine is inadequate. If he occupies the operator's station on the forward machine he is unable properly to observe the attitude of the rearward machine as is necessary in reverse driving and also particularly necessary in steering by the method of the present invention.

It is, therefore, an object of the present invention to provide a method and apparatus for improved steering of tandem hitched track-type tractors.

Another object is to provide an operator's station and steering control on the foremost of two tandem tractors which affords good visibility for an operator of a tool mounted on the foremost tractor, the immediate terrain to be encountered and the attitude of the rearmost tractor.

Another object is to provide steering controls and braking controls operable from one station to enable simultaneously and selective control of steering and braking of both tractors and more specifically to enable steering of both tractors in one direction or selectively to steer one tractor in one direction and the other in the opposite direction.

Further and more specific objects and advantages of the present invention and the manner in which it is carried into practice are made apparent in the following specification wherein reference is made to the accompanying drawings.

In the drawings:

FIG. 1 is a schematic plan view of two track-type tractors connected together in tandem relationship;

FIG. 2 is a schematic view of fluid circuits employed in obtaining the method of steering of the present invention;

FIG. 3 is a schematic view in side elevation of the tractor shown in FIG. 1; and FIG. 4 to 7, inclusive, are schematic views illustrating the method of steering of the present invention.

The two tractors schematically shown in FIGS. 1 and 2 comprise a forwardly disposed tractor, generally indicated at 10, and a rearwardly disposed tractor, generally indicated 12. These tractors are connected in tandem by a universal connection in the form of a ball and socket joint shown at 14, the ball portion of which is rigidly supported on a bracket 15 securely fixed to the final drive housing of the forward tractor. The socket portion of this connection is carried on a forward extension of a standard inside mounted C-frame 16 conventionally used in the supporting of forwardly mounted tools such as bulldozer blades and the like. The forward tractor 10 is here shown as equipped with a bulldozer blade 17 fitted for pushing operations and the rear tractors may, if desired, carry a ripper or other rear mounted tool, not shown. Such tools are desirably carried by the tandem tractors because in pushing operations, the pusher tractors are very often occupied in ripping, grading and otherwise preparing the borrow pit while scrapers are on the haul road between the borrow pit and the fill site.

The difficulties encountered in steering a tandem combination of track-type tractors and the method which overcomes these difficulties will be most easily understood by reference to FIGS. 3 to 7, inclusive. In steering by driving or braking, one track of the tractor is stopped or reduced in speed so that the opposite track, in driving faster, causes the tractor to pivot thereby assuming a different directional attitude which determines its couse when both tracks are again driving. Reduction in speed or stopping of one track is effected by disengaging the clutch which drives the track on level terrain or an uphill grade, whereas braking is sometimes also necessary particularly on a downhill grade. In FIGS. 4 to 7, the track brought to a stop by either of these methods is indicated by the letters L or R.

Referring first to FIG. 4 where the left track has been stopped, the right track driving in the direction of the arrow thereon tends to pivot the tractor about a center which for purposes of illustration is indicated at C. The actual center of pivotal movement varies under varying conditions of operation but it will always be such that the forward end of the tractor will move toward the left and the rearward end of the tractor will move toward the right.

Now considering tractors in tandem as shown at 10 and 12 in FIG. 5, it is apparent that an attempt to steer toward the left with the left clutch or the left brake tends to cause the rear end of forward tractor 10 to move in the direction of the arrow 10a whereas the forward end of the tractor at 12 tends to move in the direction of the arrow 12a so that neither tractor can move in a normal steering manner because it is connected with the other.

Steering in accordance with the present invention is best illustrated in FIGS. 6 and 7 and embodies a first step shown in FIG. 6 for negotiating a leftward turn. In FIG. 6, the right track of rearward tractor 12 has been stopped resulting in a right turn as indicated by the arrow 12a and effecting what might be considered a jackknifing action of the tandem combination. This jackknifing of the two tractors is continued only until they assume an attitude with respect to each other which corresponds to the angularity or abruptness of the turn to be maneuvered. At this time all clutches are engaged causing both machines in the combination to track, or substantially track, on a curve such as indicated by the broken line 35. A curve of smaller radius will result from leaving the steering mechanism in the condition of FIG. 6 for a longer period of time and conversely a curve of greater radius will be negotiated if the angularity of the tractors of FIG. 6 is less acute. In actual practice, the tractors are not tracking on the curve 35 but slowly veer toward a straight line track. This, however, is inconsequential because under most working conditions, turning movements are of short duration. Longer turns can be negotiated by temporarily resuming the condition shown in FIG. 6.

In accordance with the present invention, all steering and braking of both tractors whether it is to the same hand or to opposite hands is accomplished with simple controls from an operator's station on the forward tractor including a seat 21 shown in FIG. 1. The seat is disposed on a deck 22 raised approximately one foot above the level of the normal operator's deck, and the seat is disposed at an angle of approximately 45° to the longitudinal center line of the tractor. The position of the seat is such that the operator's head is substantially in alignment with the space between the left hand tractor track and the body of the tractor affording a clear view of the earth as it is approached by the track, which is highly desirable, and also a good view of a forwardly mounted tool such as the bulldozer 17 in the present case. In this position, only a slight turning of the head is required for the operator satisfactorily to observe the operation of the forward machine and tool carried thereby or the attitude of the rearward machine. As shown in FIGS. 1 and 3, the operator's station and seat has been removed from the rearward tractor 12 and the fuel tank illustrated at 23 has been moved from its normal transverse position shown on the forward tractor to a side mounted longitudinal position affording a clear view from the operator's seat 21 over the rearward tractor.

The operator's station includes a pair of brake pedals 25, a pair of throttle pedals 26 and a steering clutch control valve 28 also shown at 28 and designated V–1 in the schematic illustration of FIG. 2. Generally speaking, the operation of the control is as follows. The clutches and brakes are engaged and disengaged through pneumatic roto-chambers as is conventional practice and each of the two tractors is provided with its own source of air under pressure, schematically shown in FIG. 1 as a compressor 30 on each tractor and storage tanks 31. A bundle of hoses or other flexible conduits is shown at 32 for communicating control pressure from the forward tractor to the rearward tractor. Thus with the system to be described, the valve 28 may be manipulated to effect disengagement of the steering clutches on opposite hands of the two tractors. Similarly brake pedals 25 which are for left and right hand brakes of the front tractor will also apply the opposite brakes of the two tractors when desired.

The throttle pedals 26 are closely spaced, one controlling the delivery of fuel to the first tractor engine and the other to the second tractor engine. In practice, the operator places his foot in a central position overlapping both pedals so that acceleration and deceleration of the two tractors is simultaneous. However due to this positioning of the pedals, it is possible for the operator to command a slightly greater pushing effort from either tractor as conditions may demand by rocking his foot to depress one pedal farther than the other.

In the pneumatic circuit illustrated in FIG. 2, the components carried on the forward tractor are shown above the horizontal broken line and those on the rearward tractor below the line. The steering clutches of both tractors are actuated by pneumatic cylinders or roto chambers designated R and L CL, respectively, and the brakes are actuated by similar roto chambers designated R and L BR for the right and left brakes, respectively. The steering clutches and brakes are not illustrated nor the connection of the rotor chambers to them as this is conventional as are the roto chambers which may be of the type manufactured for Caterpillar Tractor Co. and known as Cat. No. 3D4247 roto chamber. The steering valve 28 also designated V–1 in FIG. 2 is capable of communicating the air from a source under pressure to an outlet 1 or an outlet 2 by left and right hand movement of a control lever and to an outlet 3 by forward movement of the same lever without interrupting communication with either of the outlets 1 or 2. This is also a conventional valve, one form of which is manufactured by Westinghouse Airbrake Co. and known as WABCo. No. 1D–PS–1–Flexair valve.

To cause the tractors to assume the position shown in FIG. 6, the steering valve is moved to the left to communicate the air pressure to outlet 1 and, through suitable conduits shown, to the left steering clutch of the forward tractor and the right steering clutch of the rearward tractor to effect disengagement of both clutches. The opposite turn position would be accomplished by movement of the steering valve to the right for communication of air pressure to outlet 2. The braking system is quite similar and when it is necessary to steer by braking, as distinguished from driving, either brake pedal valve is opened by depression of its pedal to communicate air to one brake on the forward tractor and the opposite brake on the rearward tractor.

When the tractors have been caused to assume the desired angular attitude with respect to each other, the steering valve is returned to neutral and the brake pedals released so that the condition prevails which is illustrated in FIG. 7. It is frequently necessary during operation of the tractors while they are negotiating a turn as shown in FIG. 7, to adjust their angularity. This can be accomplished and is provided for by the present invention by adjusting the rear tractor only so that the forward tractor can continue operation with full effective traction of both tracks. As is apparent from FIG. 7, any steering of the rearward tractor will tend also to adjust the position of the forward tractor slightly by skidding its rear end sideways and thus slight differences in angularity are accomplished.

The means for steering the rear tractor only are shown in FIG. 2 as valves V–3 associated one with each of the steering clutches and each of the brakes on the forward tractor. These valves V–3 are actuated by pressure to close communication between the source of air and the roto chambers with which they are associated and simultaneouly to vent the roto chamber. Such valves are well known, one example being that manufactured under the name WABCo. No. 528–681–Relayair valve. These valves are actuated by communicating air under pressure to outlet 3 of the steering valve from which air is communicated by suitable conduits as shown to all of the valves V–3. As previously mentioned, air is communicated to outlet 3 without interrupting the selective operation of the steering valve between outlets 1 and 2 so that the steering clutches of the rearward tractor remain operable as also do the brakes of the rear tractor.

While both tractors are illustrated in FIGS. 1 and 3 as having their own source of air under pressure, FIG. 2 shows only one air supply for purposes of simplicity. The separate sources may be used for controlling the tractors when they are disconnected from each other and may be readily combined by conventional means if it is desired to use both sources while the tractors are coupled in tandem.

I claim:

1. In combination with two articulately connected tandem arranged track-type tractors, fluid pressure means for actuating the steering clutches and brakes of both tractors, said fluid pressure means including a source of fluid under pressure, a circuit including control valves at an operator's station on one tractor, and means operable upon actuation of said control valves to release the steering clutches of opposite hand on the two tractors and selectively to release either steering clutch on one tractor.

2. The combination of claim 1 with other control valves to apply the brakes of opposite hand on the two tractors and selectively to apply either brake on one tractor.

References Cited by the Examiner

UNITED STATES PATENTS

| 1,624,110 | 4/1927 | Moncreiffe. | |
| 2,112,559 | 3/1938 | Davidson | 180—14 X |
| 2,933,143 | 4/1960 | Robinson et al. | 180—14 |
| 3,035,654 | 5/1962 | Nuttall, et al. | 180—14 |
| 3,039,553 | 6/1962 | van der Lely et al. | 180—77 |
| 3,167,147 | 1/1965 | Symons et al. | 180—77 X |

A. HARRY LEVY, *Primary Examiner.*

BENJAMIN HERSH, *Examiner.*

E. E. PORTER, *Assistant Examiner.*